Figure 1:
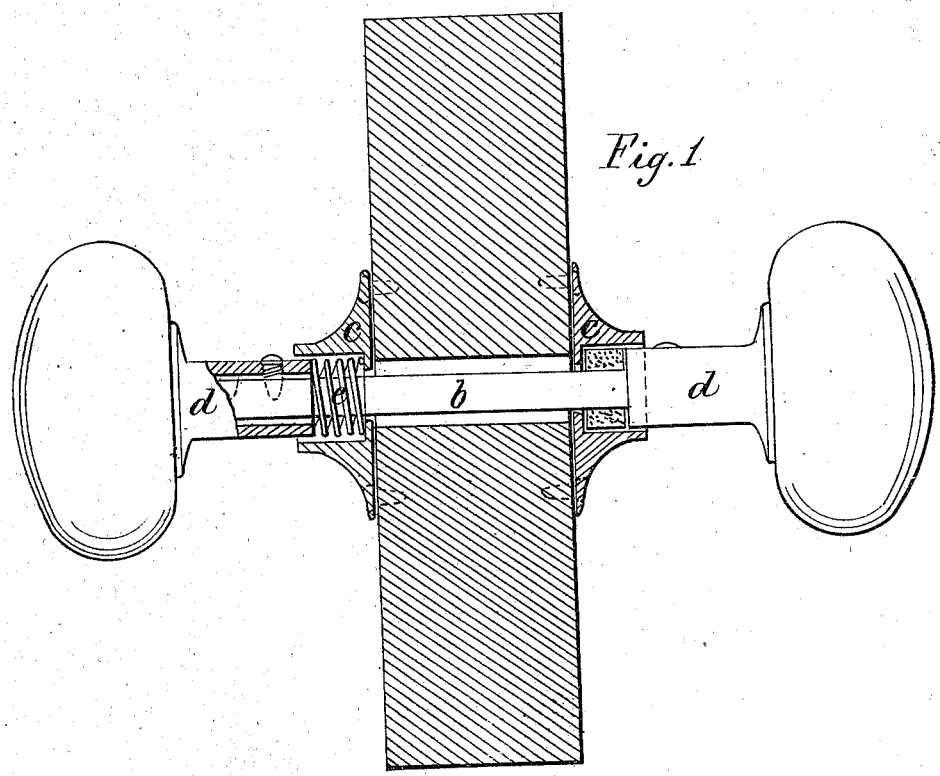

C. F. Langford,
Knob Attachment.
No. 97,654. Patented Dec. 7, 1869.

Witnesses
Kate K. Jones
Wm. C. Munroe

Inventor
Chas. F. Langford
Per J. Fraser & Co., attys

United States Patent Office.

CHARLES F. LANGFORD, OF BROOKLYN, NEW YORK.

Letters Patent No. 97,654, dated December 7, 1869.

IMPROVEMENT IN ATTACHING KNOBS TO DOORS.

The Schedule referred to in these Letters Patent and making part of the same.

I, CHARLES F. LANGFORD, of Brooklyn, in the county of Kings, and State of New York, have invented a new and useful Improvement in Attaching Knobs to Doors; and I hereby declare that the following is a full and exact descripton thereof.

The knobs of latches as ordinarily applied to doors are loose in their bearings, so as to rattle and slide when taken hold of, and this, in time, results in the loosening and loss of the screws which hold the rose, or that which secures the removable knob to the spindle, and consequently the frequent loss of the knob. This is owing to there being too much lateral motion of the spindle, resulting from the imperfect method of adapting the space between the two knobs to the thickness of the door, it being usually done by interposing rigid washers to fill the space.

It is the object of my invention to obviate these defects; and

It consists in interposing between the knobs and the rose, in the space usually filled by the washers spoken of, elastic rings or gaskets of India rubber or coiled wire, which, acting in opposite directions, keep the knobs firm, and prevent any unnecessary looseness or noise, and yet admit of their turning freely.

In the drawings—

Figure 2:
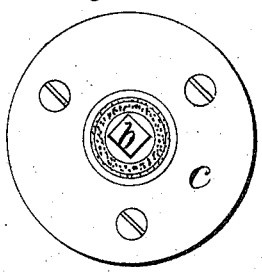

Figure 1 represents the knobs and spindle of a door, the latter being shown in section, and Figure 2, an elevation of the rose, with the knob removed.

In carrying out my invention, I dispense entirely with the usual rings and washers, and substitute an annular piece of rubber, as at $a$; $b$ being the spindle, $c$, the rose, and $d$, the shank or shoulder of one of the knobs; or, instead of this, I employ a few coils of a spiral spring, as of brass wire, as shown at $e$. Thus the space is filled, and the spring or rubber being compressed, holds the shoulder of both knobs away from the rose by pressure in opposite directions, wholly preventing noise, and producing but slight friction, so that the latch may be turned with ease.

Either a coiled metal spring or a rubber gasket may be used for this purpose, but, in most instances, the rubber is preferable, as it is easily applied and is most effectual in preventing noise.

The cost is as inconsiderable as that of the rigid washers heretofore used, while there is a great saving in the time and labor of putting on the knobs of the lock by my method, as the springs, by their elasticity, adjust themselves to the spaces, and no time has to be spent in fitting, as in filling in with the rigid rings; and a more important saving still in the greater durability, and avoidance of the necessity of repairs that is thereby attained.

If the space is not sufficient for the spring to be applied on both sides of the door, it will operate with nearly as good effect upon one side.

I claim, as my invention—

The employment of an annular spring, of rubber or metal, between the rose and shank of the knob, in attaching knobs to doors, substantially as herein set forth.

In witness whereof, I have hereunto signed my name, in the presence of two subscribing witnesses.

CHARLES F. LANGFORD.

Witnesses:
 KATE N. JONES,
 J. FRASER.